US011903893B2

(12) United States Patent
Khalid

(10) Patent No.: US 11,903,893 B2
(45) Date of Patent: Feb. 20, 2024

(54) MASSAGE DEVICE

(71) Applicant: Arslan Khalid, Falls Church, VA (US)

(72) Inventor: Arslan Khalid, Falls Church, VA (US)

( * ) Notice: Subject to any disclaimer, the term of this patent is extended or adjusted under 35 U.S.C. 154(b) by 46 days.

(21) Appl. No.: 18/080,632

(22) Filed: Dec. 13, 2022

(65) Prior Publication Data

US 2023/0210714 A1 Jul. 6, 2023

Related U.S. Application Data

(60) Provisional application No. 63/295,580, filed on Dec. 31, 2021.

(51) Int. Cl.
*A61H 15/00* (2006.01)
*A61H 23/02* (2006.01)

(52) U.S. Cl.
CPC ..... *A61H 15/0078* (2013.01); *A61H 23/0254* (2013.01); *A61H 2015/0064* (2013.01); *A61H 2015/0071* (2013.01); *A61H 2201/0157* (2013.01); *A61H 2201/0192* (2013.01); *A61H 2201/0207* (2013.01); *A61H 2201/0214* (2013.01); *A61H 2201/1215* (2013.01); *A61H 2201/164* (2013.01); *A61H 2201/165* (2013.01); *A61H 2201/1635* (2013.01); *A61H 2201/1671* (2013.01); *A61H 2201/5005* (2013.01); *A61H 2201/5097* (2013.01); *A61H 2205/06* (2013.01); *A61H 2205/10* (2013.01)

(58) Field of Classification Search
CPC ............ A61H 15/0078; A61H 23/0254; A61H 2015/0064; A61H 2015/0071; A61H 2201/0157; A61H 2201/0192; A61H 2201/0207; A61H 2201/0214; A61H 2201/1215; A61H 2201/1635; A61H 2201/164; A61H 2201/165; A61H 2201/1671; A61H 2201/5005; A61H 2201/5097; A61H 2205/06; A61H 2205/10
USPC .................................................... 601/84, 112
See application file for complete search history.

(56) References Cited

U.S. PATENT DOCUMENTS 3,814,085 A * 6/1974 Kupchinski ........ A61H 15/0092 601/133
9,839,575 B2 12/2017 Slocum et al.
(Continued)

FOREIGN PATENT DOCUMENTS

AU 2012261511 A1 6/2014

*Primary Examiner* — Tu A Vo
*Assistant Examiner* — Kelsey E Baller
(74) *Attorney, Agent, or Firm* — QUICKPATENTS, LLC; Kevin Prince

(57) ABSTRACT

A massage device for a person's appendage includes a plurality of enclosures each including an outer surface and a hollow interior space having a control circuit, a power source such as a rechargeable battery, a vibration mechanism, and preferably at least one motor and a gear arrangement. Each enclosure includes at least one roller driven by the gear arrangement and the at least one motor. A plurality of connectors are each fixed between two adjacent enclosures to form a ring with the enclosures and the connectors. The connectors are adapted to contract or expand such that with the person's appendage fitted through the ring, the connectors are retracted until the rollers each contact the person's appendage to move the device along or about the person's appendage while the vibration mechanism massages the person's appendage.

12 Claims, 5 Drawing Sheets

(56) References Cited

U.S. PATENT DOCUMENTS

| | | | | | |
|---|---|---|---|---|---|
| D841,178 | S | * | 2/2019 | Lazarides | A61H 15/02 D24/215 |
| D949,361 | S | * | 4/2022 | Nip | D24/211 |
| D961,101 | S | * | 8/2022 | Li | A61H 7/007 D24/211 |
| D961,793 | S | * | 8/2022 | Li | A61H 39/04 D24/211 |
| 2005/0187498 | A1 | | 8/2005 | Miller | |
| 2012/0010544 | A1 | | 1/2012 | Chen | |
| 2013/0085426 | A1 | * | 4/2013 | Brodsky | A61N 5/0619 601/128 |
| 2015/0094627 | A1 | * | 4/2015 | Chen | A61H 7/007 601/134 |
| 2018/0000684 | A1 | * | 1/2018 | Burrell | A61H 15/00 |
| 2018/0055723 | A1 | | 3/2018 | Bick | |
| 2019/0159958 | A1 | * | 5/2019 | Reycroft | A61H 15/02 |
| 2020/0329784 | A1 | * | 10/2020 | Wallace | A61H 15/0078 |
| 2021/0145689 | A1 | * | 5/2021 | Cheong | A61H 15/0085 |
| 2022/0040030 | A1 | * | 2/2022 | Tang | A61N 5/0625 |
| 2022/0142857 | A1 | * | 5/2022 | Wersland | A61H 15/0078 |
| 2022/0401291 | A1 | * | 12/2022 | Reynolds | A61H 39/04 |

* cited by examiner

MASSAGE DEVICE

CROSS-REFERENCE TO RELATED APPLICATIONS

This application claims the benefit of U.S. Provisional Patent Application 63/295,580, filed on Dec. 31, 2021, and is incorporated herein by reference.

STATEMENT REGARDING FEDERALLY SPONSORED RESEARCH AND DEVELOPMENT

Not Applicable.

FIELD OF THE INVENTION

This invention relates to massage devices, and more particularly to massage device that travels along a person's arm or leg.

BACKGROUND

Massage devices are quite popular and useful for relieving tightness and aches in muscles. Portable such massage devices need to be held in place while being used, which takes away some of the relaxing effect of the massage device. Further, massage devices of the prior art cannot be autonomously controlled during use, which would allow the user to more fully relax during use.

Therefore, there is a need for a massage device that fits around a person's appendage and can spin around or travel along the person's appendage without being held by the person. Such a needed invention would provide for thermal therapy and compression around the person's appendage. Such a needed device would further provide for programmed patterns of therapy and autonomous movement along and about the person's appendage. The present invention accomplishes these objectives.

SUMMARY OF THE INVENTION

The present device is a massage device for an appendage of a person, such as a person's arm, leg, or even torso, neck, head, foot, hand, or the like. A plurality of enclosures each comprise an outer surface and a hollow interior space. The hollow interior space contains a control circuit, a power source such as a rechargeable battery, a vibration mechanism, and optionally but preferably at least one motor and a gear arrangement. The control circuit controls the supply of power from the power source to the at least one motor and the vibration mechanism. Each enclosure preferably includes at least one roller driven by the gear arrangement and the at least one motor. Each of the at least one rollers is adapted to contact the person's appendage and move the enclosure on the person's appendage.

A plurality of connectors are each fixed between two adjacent enclosures to form a ring with the enclosures and the connectors. The connectors are adapted to contract or expand to decrease or increase a diameter of the ring to fit around the person's appendage. As such, with the person's appendage fitted through the ring and the connectors retracted such that the enclosures each contact the person's appendage, the rollers move on the person's appendage while the vibration mechanism massages the person's appendage.

Preferably there are an even number of enclosures, such as four, and an even number of connectors, such as four. As such, the rollers of at least two of the enclosures are aligned with a longitudinal axis of the person's appendage, such that the massage device can roll back and forth along the person's appendage. In such an embodiment, the rollers of the other enclosures are orthogonally aligned with the longitudinal axis of the person's appendage, such that the massage device can spin around the person's appendage. Thus the massage device can both spin about the person's appendage and roll back and forth along the person's appendage to massage substantially the entire appendage.

Preferably the hollow interior space of each enclosure further includes a thermal unit electrically connected with the control circuit. Such a thermal unit can be of the type that either heats or cools, or both, by utilizing electricity from the power source. As such, thermal therapy can be delivered to the person through heating or cooling each enclosure.

The control circuits of each enclosure preferably include a wireless module that receives wireless commands from a controller, such as an application running on a smart phone or a stand-alone wireless remote control. The controller includes a plurality of interface devices such as buttons or the like for send each of the commands.

Each control circuit is preferably adapted to wirelessly communicate with the control circuits of the other enclosures to accomplish the commands from the controller. Alternately, the control circuit of one of a master enclosure directs the actions of each of the other slave enclosures via one or more electrical conductors disposed between each of the enclosures. Each control circuit is set as either having a longitudinally aligned roller or an orthogonally aligned roller with respect to the person's appendage so that each control circuit responds to the commands of the controller accordingly.

The present invention is a massage device that fits around a person's appendage and can spin around or travel along the person's appendage without being held by the person during use. The present device provides for thermal therapy and compression around the person's appendage, and further provides for programmed patterns of therapy and autonomous movement along and about the person's appendage. Other features and advantages of the present invention will become apparent from the following more detailed description, taken in conjunction with the accompanying drawings, which illustrate, by way of example, the principles of the invention.

DETAILED DESCRIPTION OF THE PREFERRED EMBODIMENT

Illustrative embodiments of the invention are described below. The following explanation provides specific details for a thorough understanding of and enabling description for these embodiments. One skilled in the art will understand that the invention may be practiced without such details. In other instances, well-known structures and functions have not been shown or described in detail to avoid unnecessarily obscuring the description of the embodiments.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list. When the word "each" is used to refer to an element that was previously introduced as being at least one in number, the word "each" does not necessarily imply a plurality of the elements, but can also mean a singular element.

Figure 1:
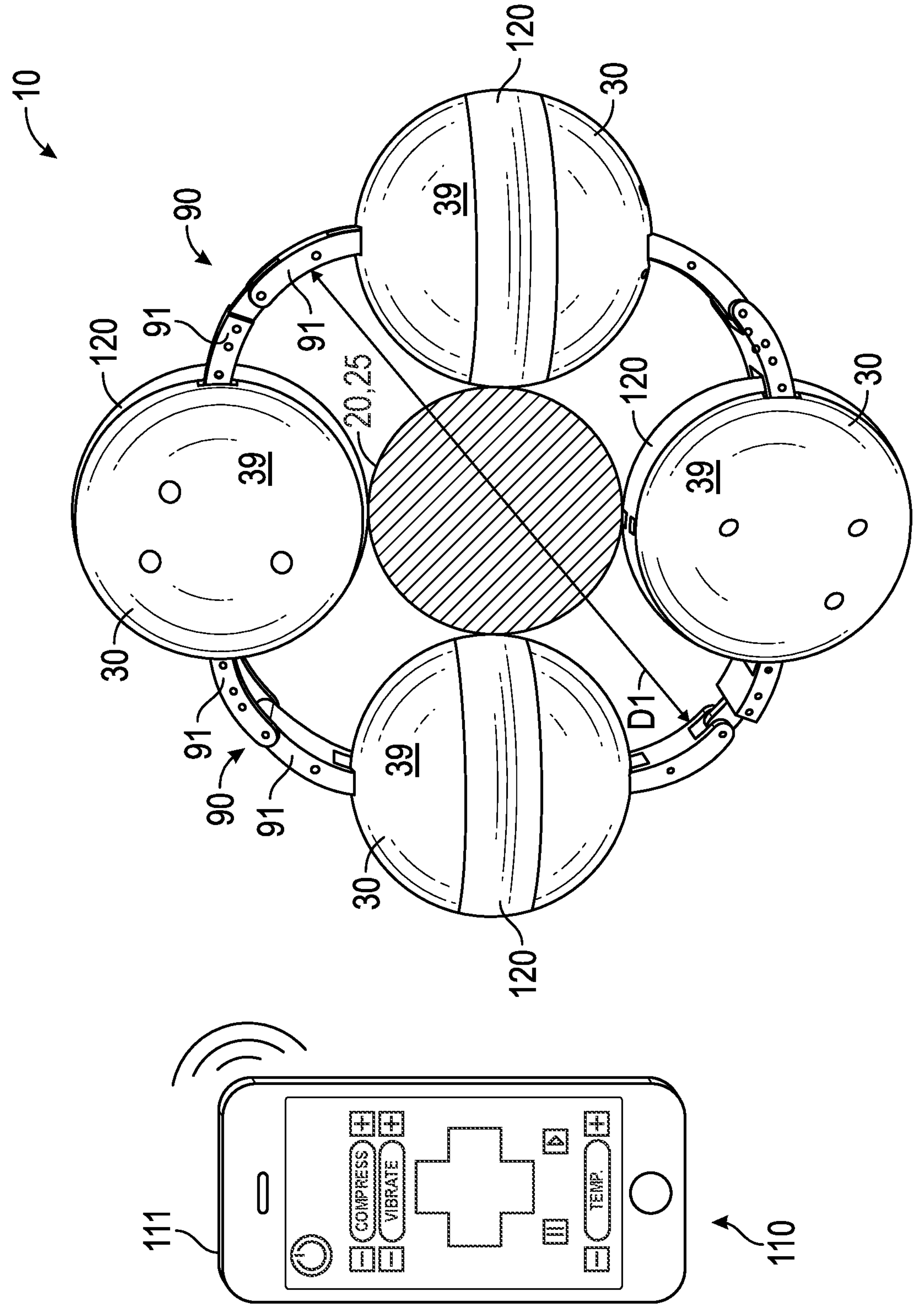
FIG. 1 is a perspective view of the invention, illustrating a plurality of enclosures and connectors arranged in a substantially circular ring, the invention controlled by an application executing on a smart phone.
Figure 2:
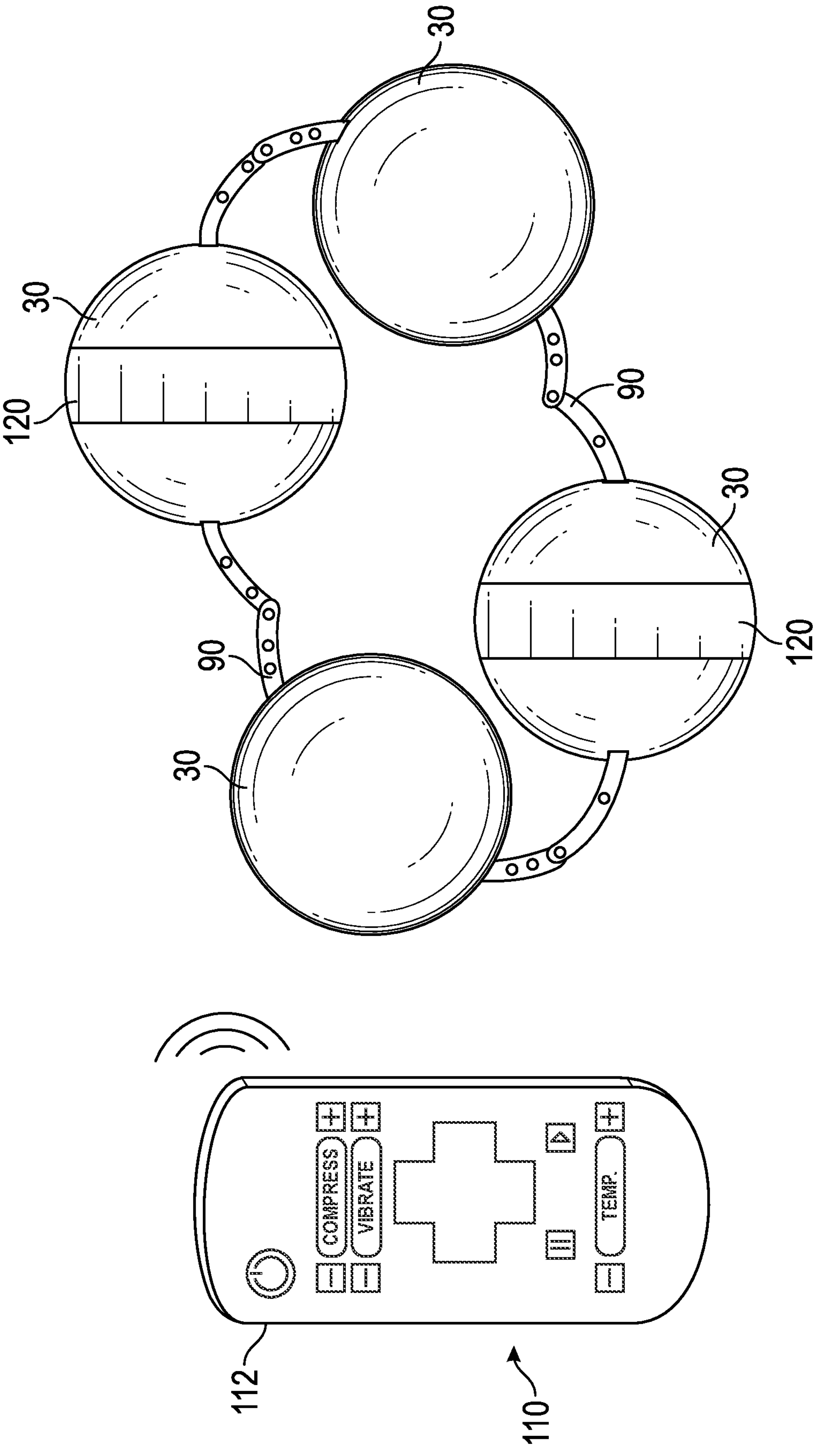
FIG. 2 is a perspective view of the invention, illustrating the plurality of enclosures and connectors in a skewed arrangement, the invention controlled by a remote control.
Figure 3:
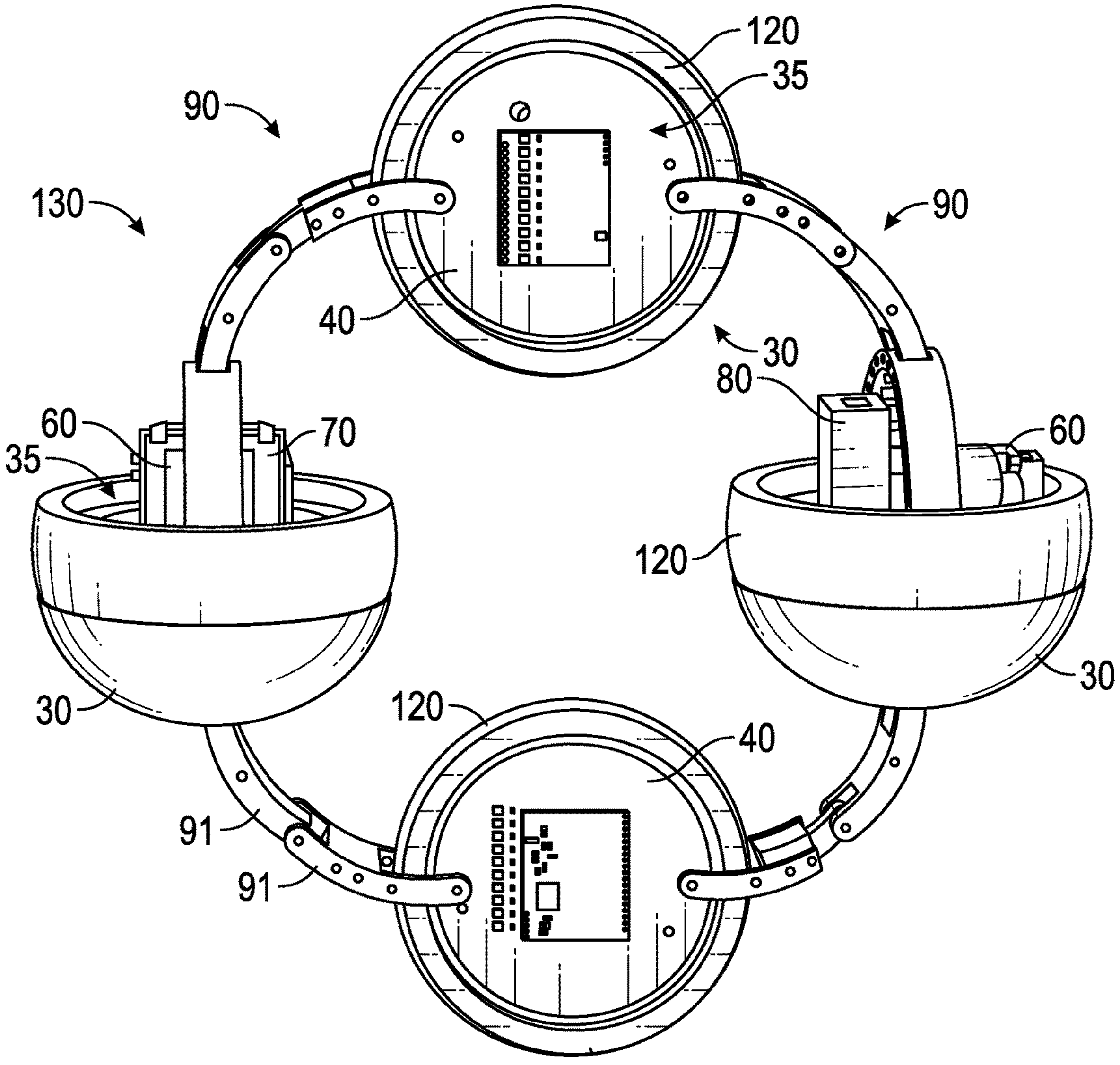
FIG. 3 is a perspective view of FIG. 1 with portions of the enclosure omitted for clarity of design.
Figure 4:
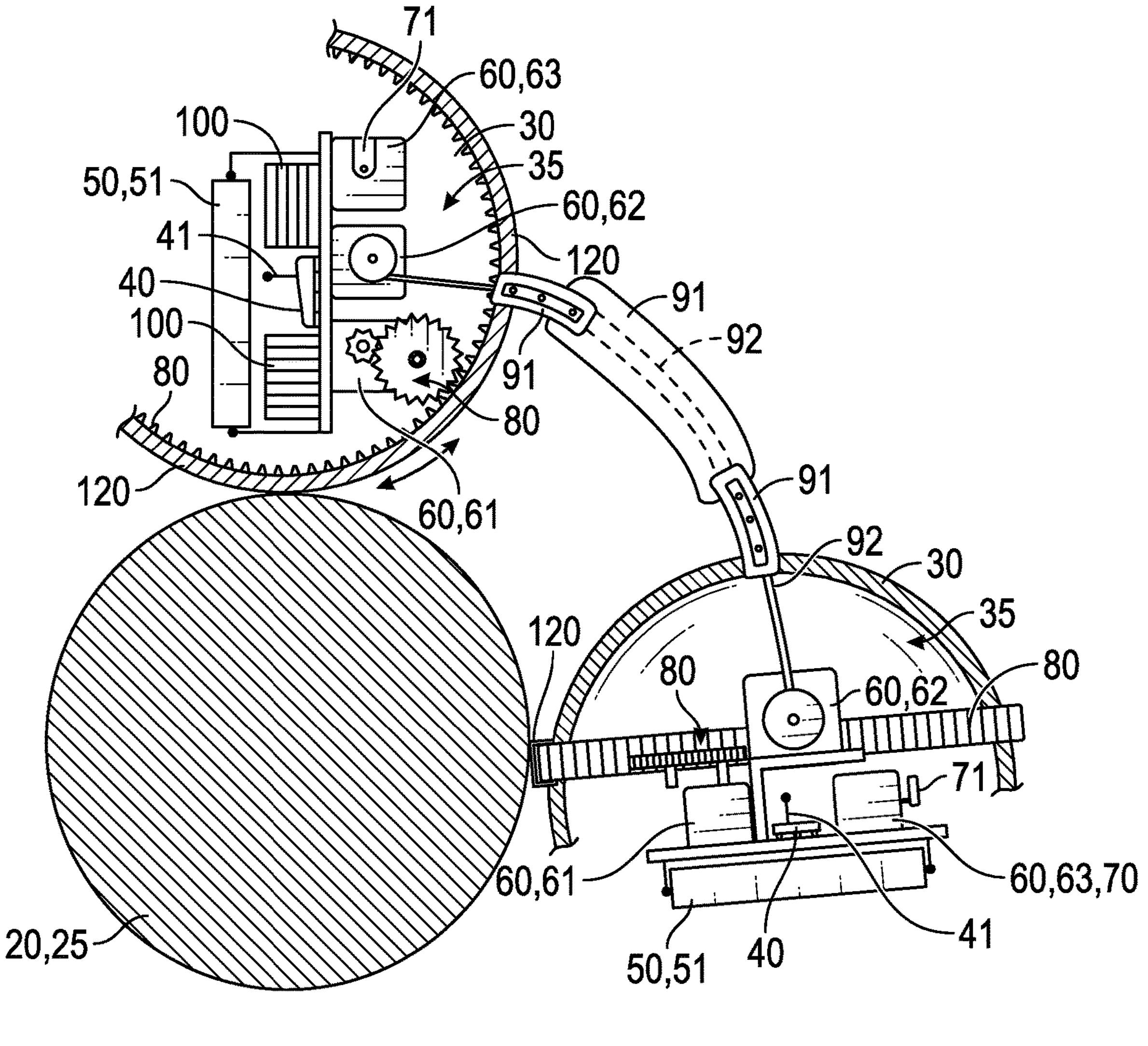
FIG. 4 is a partial diagram of two adjacent enclosures and components therein.

FIGS. 1 and 2 illustrate a massage device 10 for an appendage 25 of a person 20, such as a person's arm, leg, or even torso, neck, head, foot, hand, or the like. A plurality of enclosures 30 each comprise an outer surface 39 and a hollow interior space 35 (FIGS. 3 and 4). The hollow interior space 35 contains a control circuit 40, a power source 50 such as a rechargeable battery 51, and a vibration mechanism 70. Preferably the hollow interior space further includes at least one motor 60 and a gear arrangement 80. The control circuit 40 controls the supply of power from the power source 50 to the at least one motor 60 and the vibration mechanism 70. Preferably each enclosure 30 is spherical, but each enclosure 30 could also be an ovoid, cylinder, or some other suitable shape.

Preferably the rechargeable battery 51 can be charged inductively by placing the massage device 10 on an inductive recharging device (not shown), as is known in the art.

The enclosure 30, in preferred embodiments, includes at least one roller 120 driven by the gear arrangement 80 and the at least one motor 60. The roller 120 is adapted to contact the person's appendage 25 and move the enclosure 30 on the person's appendage 25. The roller 120 may include an elastomeric or other high-friction material for maintaining contact with the person's skin. Preferably the enclosures 30 are each made with a rigid plastic or metallic material.

A plurality of connectors 90 are each fixed between two adjacent enclosures 30 to form a ring 130 (FIG. 3) with the enclosures 30 and the connectors 90. The connectors 90 are adapted to contract or expand to decrease or increase a diameter $D_1$ of the ring 130 to fit around the person's appendage 25.

As such, with the person's appendage fitted through the ring 130 and the connectors retracted such that the enclosures 30 each contact the person's appendage 25, the rollers 120 move on the person's appendage 25 while the vibration mechanism 70 massages the person's appendage 25.

Figure 5:
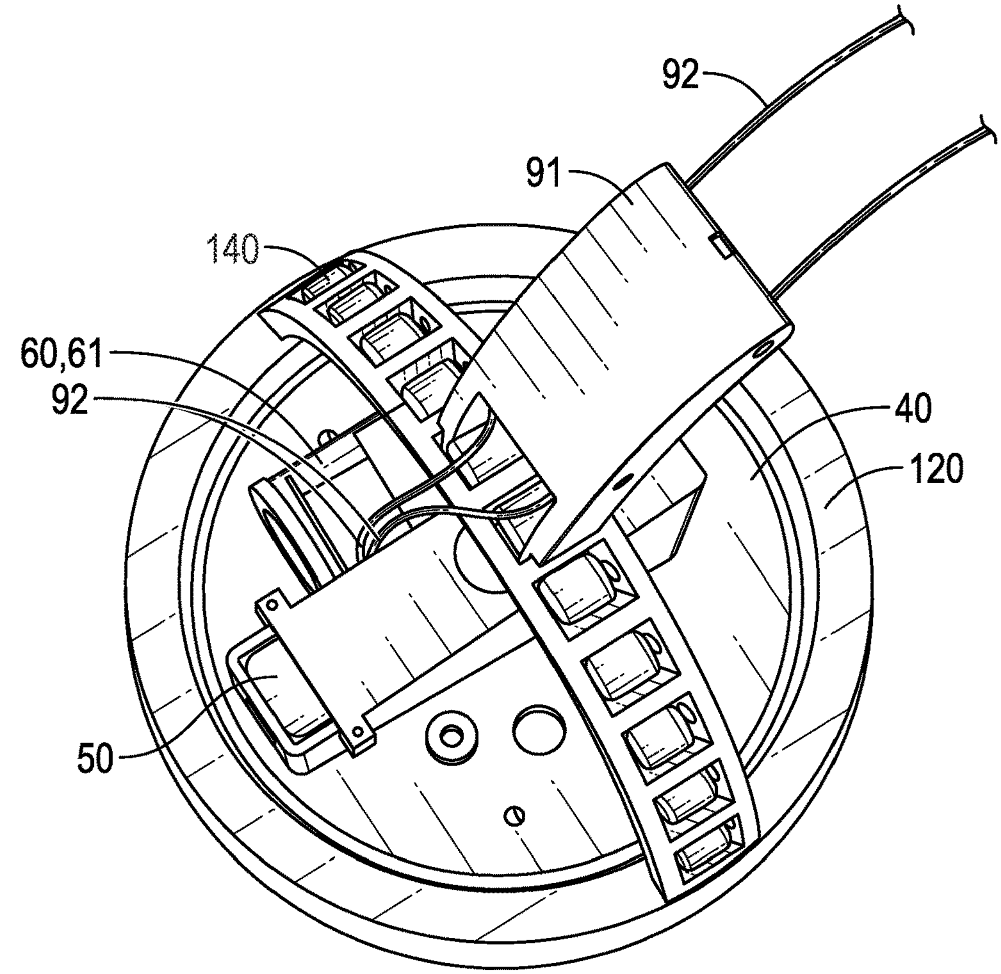
FIG. 5 is a partial perspective view of an alternate embodiment of the invention.

Preferably there are an even number of enclosures 30, such as four, and an even number of connectors 90, such as four. As such, the rollers 120 of at least two of the enclosures 30 are aligned with a longitudinal axis of the person's appendage 25, such that the massage device 10 can roll back and forth along the person's appendage 25. In such an embodiment, the rollers 120 of the other enclosures 30 are orthogonally aligned with the longitudinal axis of the person's appendage 25, such that the massage device 10 can spin around the person's appendage 25. Thus the massage device can both spin about the person's appendage and roll back and forth along the person's appendage to massage substantially the entire appendage. In some embodiments, additional roller assemblies 140 (FIG. 5) may be included to aid in the rolling of the enclosure 30 along the person's appendage 25.

Preferably the hollow interior space 35 of each enclosure 30 further includes a thermal unit 100 electrically connected with the control circuit 40. Such a thermal unit 100 can be of the type that either heats or cools, or both, by utilizing electricity from the power source 50. As such, thermal therapy can be delivered to the person 20 through heating or cooling each enclosure 30. Preferably in such embodiments, at least a portion of the enclosure is made with a thermal-conducting material such as metal.

Preferably the at least one motor 60 of each enclosure 30 includes a first motor 61 (FIG. 4) for moving the roller 120 via the gear arrangement 80 and a third motor 63 that includes an offset weight 71 and is used as the vibration mechanism 70. At least half of the enclosures 30, such as every other enclosure 30, includes a second motor 62 for contracting or expanding two of the connectors 90 that each terminate within the hollow interior space 35 of the enclosure 30

Figure 6:
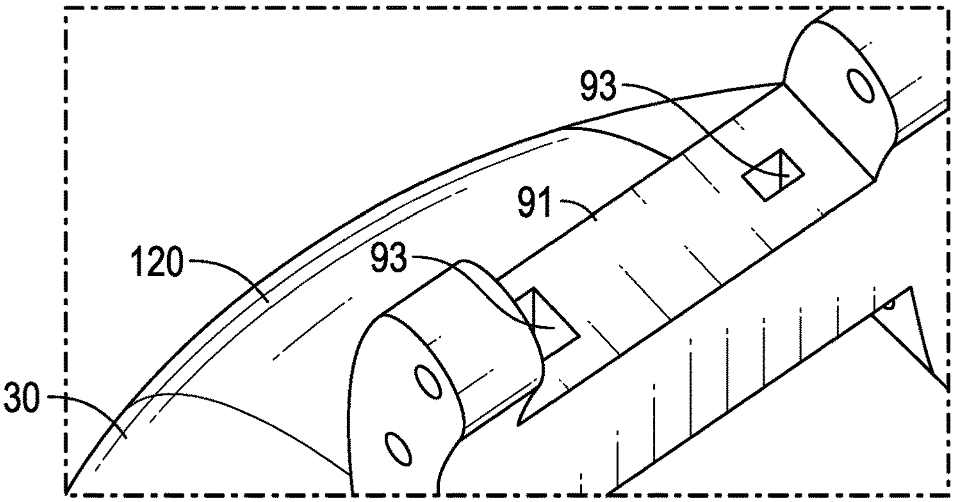
FIG. 6 is a partial perspective view of an articulated linkage of one of the connectors.

In some embodiments each connector 90 includes two or more rigid articulated brackets 91, each slidably mutually engaged (FIG. 4). Two of the brackets 91 of each connector 90 are pivotally fixed with one of two adjacent enclosures 30 such that the enclosures 30 and the connector 90 is relatively movable to fit around the form of the person's appendage 25. Further, each connector 90 includes at least one elastomeric member 92 for urging the articulated brackets 91 mutually towards each other to minimize the diameter $D_1$ of the ring 130. Each articulated bracket 91 is preferably made with a plastic or metallic material, and may include one or more apertures 93 (FIG. 6) or channels through which the elastomeric member 92 traverses. Each elastomeric member 92 is fixed with the second motor 62 of at least one of two adjacent enclosures 30, such that the connector 90 is retracted or allowed to expand based on the length of the elastomeric member 92 as set by the second motor 62.

The control circuits 40 of each enclosure 30 preferably include a wireless module 41 (FIG. 4) that receives wireless commands from a controller 110, such as an application running on a smart phone 111 (FIG. 1), or a stand-alone wireless remote control 112 (FIG. 2). Such commands may be sent from the controller 110 to each wireless module 41 of the control circuits 40 via a Bluetooth, Wi-Fi, or other suitable wireless protocol. Alternately, the control circuit 40 of one of a master enclosure 30 directs the actions of each of the other slave enclosures 30 via one or more electrical conductors (not shown) disposed between each of the enclosures 30. Such conductors can be disposed within the connectors 90 or above the connectors 90, such that they can accommodate the expansion and contraction of the massage device 10. Such conductors may carry power and commands from the master enclosure 30 to the other slave enclosures 30.

The controller 110 includes a plurality of interface devices such as buttons or the like for send each of the commands. The commands preferably including the following commands:

- "On" command to direct the control circuit 40 to become active out of a sleep mode;
- "Off" command to direct the control circuit 40 to go into a sleep mode;
- "Longitudinal up" command to cause the massage device 10 to travel in one direction along the person's appendage 25, wherein at least two of the enclosures 30 activate their first motors 61 in a first direction;
- "Longitudinal down" command to cause the massage device 10 to travel in an opposing direction along the person's appendage 25, wherein the at least two of the enclosures 30 active their first motor 61 in a second direction;
- "Spin clockwise" command to cause the massage device 10 to spin in one direction about the person's appendage 25 wherein at least two of the enclosures 30 activate their first motor 61 in a first direction;
- "Spin counter-clockwise" command to cause the massage device 10 to spin in an opposing direction about the person's appendage 25 wherein the at least two of the enclosures 30 activate their first motors 61 in a second direction;
- "Contract" command wherein the second motors 62 of each enclosure 30 are activated to contract the connectors 90;
- "Expand" command wherein the second motors 62 of each enclosure 30 are activated to expand the connectors 90;
- "Heat" command to activate the thermal unit 100 to increase the temperature of the enclosure 30;
- "cool" command to activate the thermal unit 100 to decrease the temperature of the enclosure 30; and
- "Vibration level" command to activate the third motor 63 vibrating mechanism 70 to one of a number of preset vibration intensity levels, one of which is zero wherein the third motor 63 vibrating mechanism 70 is off.

Other commands may be included if other functions are added to the enclosures 30, such as LED therapy, electric shock therapy, or the like. Combinations or patterns of commands can be programmed into the controller 110 as well, such as a combination of contracting and expanding the connectors 90 while moving the massage unit 10 along person's appendage 25, for example.

Each control circuit 40 is adapted to wirelessly communicate with the control circuits 40 of the other enclosures 30 to accomplish the commands from the controller 110. Each control circuit 40 set as either having a longitudinally aligned roller 120 or an orthogonally aligned roller 120 with respect to the person's appendage 25 so that each control circuit 40 responds to the commands of the controller 110 accordingly.

While a particular form of the invention has been illustrated and described, it will be apparent that various modifications can be made without departing from the spirit and scope of the invention. For example, while the massage device 10 is shown in the drawings as having four enclosures 30, the massage device 10 could also include 3, 5, 6, 8, 10, 12 or more enclosures, as desired. Accordingly, it is not intended that the invention be limited, except as by the appended claims.

Particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention.

The above detailed description of the embodiments of the invention is not intended to be exhaustive or to limit the invention to the precise form disclosed above or to the particular field of usage mentioned in this disclosure. While specific embodiments of, and examples for, the invention are described above for illustrative purposes, various equivalent modifications are possible within the scope of the invention, as those skilled in the relevant art will recognize. Also, the teachings of the invention provided herein can be applied to other systems, not necessarily the system described above. The elements and acts of the various embodiments described above can be combined to provide further embodiments.

All of the above patents and applications and other references, including any that may be listed in accompanying filing papers, are incorporated herein by reference. Aspects of the invention can be modified, if necessary, to employ the systems, functions, and concepts of the various references described above to provide yet further embodiments of the invention.

Changes can be made to the invention in light of the above "Detailed Description." While the above description details certain embodiments of the invention and describes the best mode contemplated, no matter how detailed the above appears in text, the invention can be practiced in many ways. Therefore, implementation details may vary considerably while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated.

While certain aspects of the invention are presented below in certain claim forms, the inventor contemplates the various aspects of the invention in any number of claim forms.

Accordingly, the inventor reserves the right to add additional claims after filing the application to pursue such additional claim forms for other aspects of the invention.

What is claimed is:

1. A massage device for an appendage of a person, comprising:

a plurality of enclosures each comprising an outer surface and a hollow interior space, the hollow interior space containing a control circuit, a power source, and a vibrating mechanism;

a plurality of connectors each fixed between two adjacent enclosures of the plurality of enclosures to form a ring with the plurality of enclosures and the plurality of connectors, wherein the plurality of connectors are rigid parts and are adapted to contract or expand to decrease or increase a diameter of the ring to fit around the person's appendage;

wherein each enclosure further includes at least one roller driven by a gear arrangement and at least one motor, the at least one roller adapted to contact the person's appendage and move the enclosure on the person's appendage with the massage device cohesively in one or more directions; and wherein each enclosure includes a first motor of the at least one motor, for moving the roller via the gear arrangement, and wherein the vibrating mechanism includes a third motor of the at least one motor having an offset weight, and wherein at least half of the enclosures each include a second motor of the at least one motor for contracting or expanding two of the connectors that each terminate within the hollow interior space of the enclosure;

whereby the rollers of at least two of the enclosures are aligned with a longitudinal axis of the person's appendage, and wherein the rollers of at least a second two of the enclosures are orthogonally aligned with the longitudinal axis of the person's appendage, whereby with the person's appendage fitted through the ring and the connectors retracted such that the enclosures each contact the person's appendage, the rollers move on the person's appendage while the vibration mechanism massages the person's appendage, the massage device being able to roll back and forth along the person's appendage and also spin around the person's appendage.

2. The massage device of claim 1 wherein the hollow interior space further includes a thermal unit that can decrease in temperature, whereby a temperature lower than an ambient temperature is applied to the person's appendage.

3. The massage device of claim 1 wherein the hollow interior space further includes a thermal unit that can increase in temperature, whereby a temperature higher than an ambient temperature is applied to the person's appendage.

4. The massage device of claim 1 wherein the hollow interior space further includes a thermal unit that can decrease or increase in temperature, whereby a temperature lower or higher than an ambient temperature is applied to the person's appendage.

5. The massage device of claim 1 wherein the power source is a rechargeable battery.

6. The massage device of claim 5 wherein the rechargeable battery of each enclosure can be recharged inductively by placing the massage device on an inductive recharging device.

7. The massage device of claim 1 wherein each connector includes two or more articulated brackets each slidably mutually engaged, two of the brackets pivotally fixed with one of the enclosures such that the enclosures and connectors are relatively movable to fit around the form of the person's appendage, each connector including at least one elastomeric member for urging the articulated brackets mutually towards each other to minimize the diameter of the ring, each elastomeric member fixed with the second motor of at least one of the enclosures.

8. The massage device of claim 7 wherein each control circuit is adapted to receive wireless commands from a controller, the commands including an "on" command to become active out of a sleep mode, an "off" command to go into a sleep mode, a "longitudinal up" command to travel in one direction along the person's appendage, wherein at least two of the enclosures activate their first motors in a first direction; a "longitudinal down" command to travel in an opposing direction along the person's appendage, wherein the at least two of the enclosures active their first motors in a second direction; a "spin clockwise" command to spin in one direction about the person's appendage wherein at least two other of the enclosures activate their first motors in a first direction; a "spin counter-clockwise" command to spin in an opposing direction about the person's appendage wherein the at least two other of the enclosures activate their first motors in a second direction; a "contract" command wherein the second motors of each enclosure are activated to contract the connectors; and an "expand" command wherein the second motors of each enclosure are activated to expand the connectors;

each control circuit adapted to wirelessly communicate with the control circuits of the other enclosures to accomplish the commands from the controller, each control circuit set as either having a longitudinally aligned roller or an orthogonally aligned roller with respect to the person's appendage so that each control circuit responds to the commands of the controller accordingly.

9. The massage device of claim 8 wherein each control circuit is adapted to receive further wireless commands from the controller that include a "heat" command to activate a thermal unit to increase the temperature of the enclosure, a "cool" command to activate the thermal unit to decrease the temperature of the enclosure; and a "vibration level" command to activate the third motor vibrating mechanism to one of a number of preset vibration intensity levels, one of which is zero wherein the third motor vibrating mechanism is off.

10. The massage device of claim 9 wherein the controller includes an application running on a smart phone that is equipped with a wireless protocol, each control circuit of the massage device including a wireless module for receiving the commands via the wireless protocol from the smart phone application.

11. The massage device of claim 9 wherein the controller includes a remote control device that has a wireless module able to transmit commands wirelessly, and a plurality of interface devices corresponding to the commands that each control circuit is able to receive and act upon, each control circuit of the massage device including a separate wireless module for receiving the commands of the wireless module of the remote control.

12. The massage device of claim 9 wherein each enclosure is substantially spherical.

* * * * *